Dec. 28, 1954 H. ZOLTOK 2,698,172
SPRING SUSPENSION MEANS FOR VEHICLES
Filed March 15, 1951

INVENTOR:
HARRY ZOLTOK
BY: Fetherstonhaugh & Kent
HIS ATTY'S

United States Patent Office 2,698,172
Patented Dec. 28, 1954

2,698,172

SPRING SUSPENSION MEANS FOR VEHICLES

Harry Zoltok, St. Vital, Manitoba, Canada

Application March 15, 1951, Serial No. 215,774

2 Claims. (Cl. 267—30)

My invention relates to new and useful improvements in spring suspension means for vehicles, an object of my invention being to provide a device of the character herewithin described which eliminates the conventional metal shackles between leaf springs and the chassis of the vehicle.

A further object of my invention is to provide a device of the character herewithin described which utilizes resilient bushings having substantially a triangular section whereby the relatively large radius of the load carrying portion carries the weight of the vehicle and the pair of radially disposed compression portions enables the overall total section of the bushing to be reduced to a practical dimension. Also, the bushings act as stiffening devices requiring considerable force to move same longitudinally thereby carrying part of the weight of the body of the vehicle in the swinging shackles and reducing the total thickness of the spring as compared to conventional methods of spring suspension.

Yet another object of my invention is to provide a device of the character herewithin described in which the use of the triangular or sectoral resilient bushings definitely locate all spring suspension points which allow the rear axle as well as the front axle of the vehicle to float in the same constant position with relation to the body thereof and at the same time, absorb all road shocks while maintaining perfect alignment with said body.

Still another object of my invention in conjunction with the foregoing object, is to provide a device of the character herewithin described in which the sectoral shape of the resilient bushings, particularly when installed in conjunction with the front axle spring suspension, maintains said axle in the same plane with relation to the steering and absorbs the majority of road shocks without transferring same to the steering column and steering wheel. This is in contrast with prior practice in which the forward ends of the front leaf springs of vehicles have been anchored solidly to the chassis in order to eliminate a condition of axle movement thereby affecting steering stability. In the present invention, both the front and rear ends of the front springs are allowed to move and yet do not affect the steering in any way except by the elimination of shock and vibration due to the fact that the axle moves vertically in the same plane and does not change position horizontally with relation to the steering.

Still another object of my invention is to provide a device of the character herewithin described which practically eliminates road shock and vibration being transferred from the unsprung weight of the vehicle to the sprung weight and thence to the passengers of said vehicle.

Still another object of my invention in conjunction with the foregoing object is to provide a device of the character herewithin described which, due to the reduction in road shock and vibration, materially extends the life of the leaf springs and the body work of the vehicle.

A further object of my invention is to provide a device of the character herewithin described which, due to the sectoral cross-sectional configuration of the resilient bushings, provides a self-centering form of spring anchoring means.

A still further object of my invention is to provide a device of the character herewithin described in which the resistance to movement or flow of the resilient material used in the bushings may be varied thereby permitting a difference in horizontal movement to occur between the front and rear shackles of any individual spring.

Still another object of my invention is to provide a device of the character herewithin described which is extremely easy to maintain and replace without the necessity of dismantling the entire spring assembly.

Yet another object of my invention is to provide a device of the character herewithin described which is simple in construction, economical in operation, and otherwise well suited for the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

Conventional leaf springs of vehicles are normally anchored at one end thereof to the chassis of the vehicle, the opposite end being connected to the chassis by means of a swinging link or shackle to allow the spring to extend or contract in length depending upon the varying loads imposed thereon. Attempts have been made in the past to secure both ends of a leaf spring to the chassis by means of swinging shackles and although this has been possible to a limited extent with relation to rear axles of vehicles due to the positioning effect of the drive shaft, it has been found impractical to adapt this type of suspension to the front axle of a vehicle due to the linkage connections thereof to the steering column and steering mechanism. The present invention has overcome these difficulties and at the same time, provided a spring suspension means which practically eliminates any transfer of vibration or shock from the unsprung portion of a vehicle (namely the road wheels and axles) to the sprung portion of a vehicle (namely the chassis and body).

Figure 1:
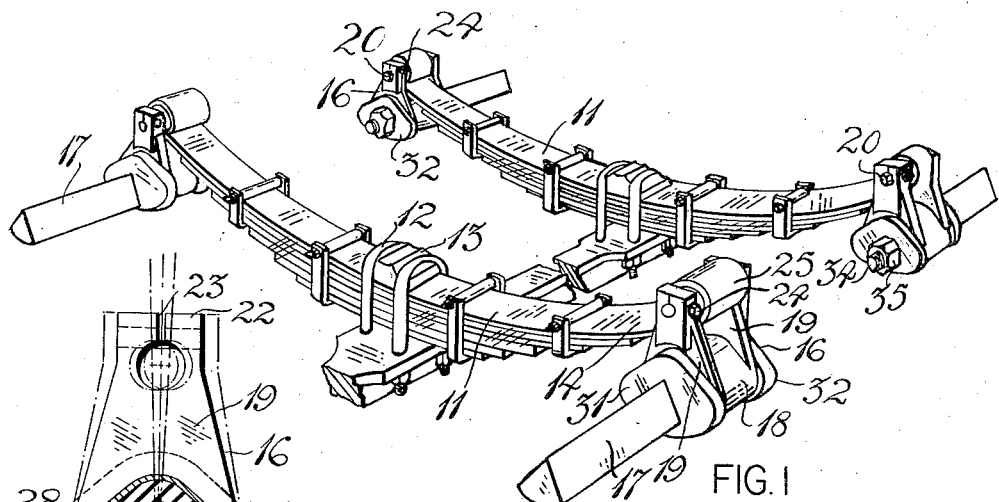
Figure 1 is a perspective view of a front axle assembly showing a pair of springs mounted thereon together with my shackle assemblies.

Proceeding now to describe my invention in detail, it will be seen upon reference to the accompanying drawings that I have illustrated in Figure 1, in fragmentary form, a conventional front axle 10 upon which is mounted in parallel relationship, a pair of semi-elliptical leaf springs 11 secured thereto by conventional U-bolts 12 engaging spring saddles 13.

The ends 14 of the leaf springs 11 are secured to the chassis of the vehicle (illustrated only in phantom in Figure 2 by reference character 15) by means of what I define as resilient, semi-oscillating shackle assemblies collectively designated 16. The shackle assemblies themselves are mounted upon torsion tubes or bars 17 which, in turn, may be secured to the chassis of the vehicle by any convenient means, it being understood that these tubes support the full weight of the chassis and body.

Figure 4:
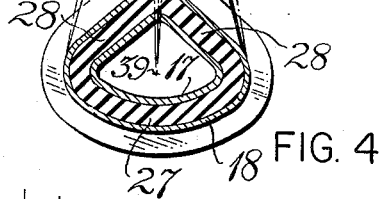
Figure 4 is a side section of one of my bushings in situ illustrating the relative movement thereof in phantom.

The aforementioned shackle assembly 16 includes a shackle casing 18 of hollow formation and having a cross-sectional configuration substantially sectoral in shape as illustrated in Figure 4 of the accompanying drawings. This casing is provided with a pair of upstanding shackle plates 19 welded thereto in spaced and parallel relationship, said plates acting as supports for a spring bearing pin 20 which is mounted within aperture 21 formed within said upstanding plates. The upper ends 22 of said plates are split as at 23 and drilled to receive clamping bolts 24 which, when tightened, maintain pin 20 firmly in position.

The aforementioned pin 20 acts as a bearing support for the eye 25 formed within the ends of the uppermost leaves of the springs 11 as clearly illustrated in Figure 1, it being understood that said pin acts as a bearing and permits partial rotation of the eye 25 during movement of the springs 11.

Figure 3:
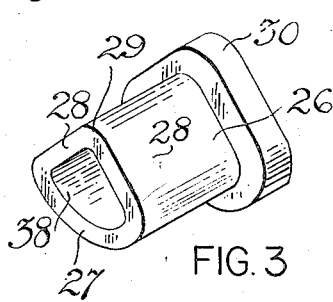
Figure 3 is a perspective view of one of the sectoral resilient bushings.

A sectoral resilient bushing collectively designated 26 is also included within the aforementioned shackle assembly 16 and is situated between the casing 18 and the torsion tube 17. This resilient bushing is formed in two parts of which one is shown in detail in Figure 3 and it will be observed that each portion is hollow and substantially sectoral in cross-sectional configuration. Each portion of the bushing 26 includes what I define as an arcuate load carrying portion 27 and a pair of radially disposed compression portions 28 coterminous therewith and inclining inwardly to a common apex 29. Upon one end of each portion, I have provided a compression flange 30 extending around the perimeters of the portions 27, 28 and 29, the purpose of which will hereinafter be described.

Figure 2:
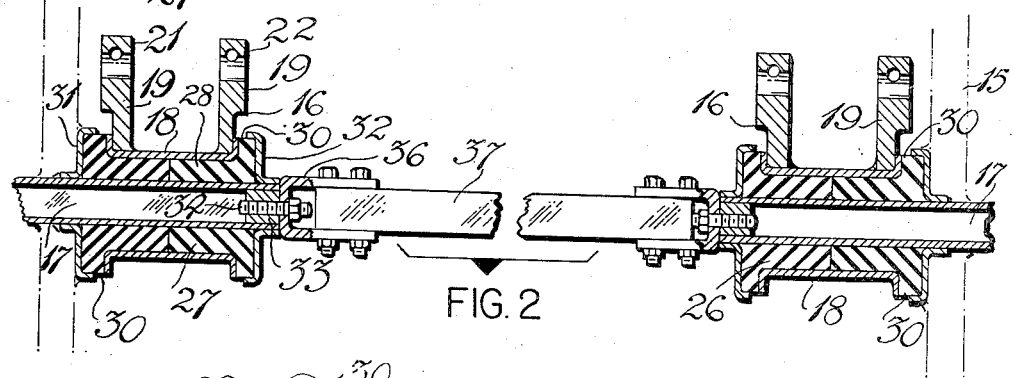
Figure 2 is a vertical section through a pair of my shackle assemblies as installed upon the rear axle of a vehicle.

Each portion of the resilient bushing 26 is insertable within shackle casing 18 as shown in Figure 2 with the flanges 30 lying against the side of the casing. Means to retain said portions in position are provided and take the form of a sectorally shaped end cap 31 which is secured to the tube 17 and embraces the flange 30 of one of said bushing portions. A corresponding end cap 32 is slideably receivable over the resilient tube 17 and embraces the opposite flange 30 of the other portion of the bushing. I have provided means for clamping the end caps 31 and 32 together along the torsion tube 17 so that the flanges 30 together with the bushings 26 may be preloaded as required. This means includes a plug 33 secured within one end of tube 17 having a stud 34 extending outwardly therefrom upon which nut 35 may be tightened thereby adjusting the spacial relationship between the end caps 31 and 32 thereby pre-loading the bushing 26. In this connection it will be noticed that in Figure 1 the nut is screwed directly upon stud 34 whereas in Figure 2 it also serves to hold an attachment bracket 36 which, in turn, acts as a support for a tie bar 37 spanning two adjacent shackle assemblies for added rigidity if necessary.

It will be observed that the aforementioned torsion tube 17 is of a similar cross-sectional configuration as the interior configuration 38 of the bushing 26 thereby preventing rotation of said bushing upon said tube. It will also be noticed that the aforementioned shackle casing 18 is of a similar configuration to the exterior configuration of the bushing thereby preventing relative movement between the shackle casing and the bushing, any movement being taken up entirely by the wall thickness of said bushing as will hereinafter be described.

In operation, the spring assembly may be mounted as illustrated with the torsion tube 17 anchored securely to the chassis of the vehicle. When an oscillating load is applied to the leaf springs 11, the ends thereof tend to extend or contract thereby causing the shackle casings to rotate partially to compensate therefor. Reference to Figure 4 will show the relative movement of the component parts of the shackle assembly and it will be observed that the upper ends 22 of the shackle plates 19 may oscillate around a theoretical centre 39, relative movement between the shackle casing 18 and the stationary torque tube 17 being taken up by compression of the radially disposed compression portions 28 of the bushing. This permits the normal action of the springs to occur without the undesirable transfer of vibration or shock therefrom to the torque tube 17 and thence to the body of the vehicle.

By varying the hardness of the material forming the resilient bushing between the front and rear shackle assemblies of a spring, the relative oscillation of the shackle casing may be controlled as desired to prevent any undesirable horizontal movement of the associated axle occurring. It will be realized, of course, that the main load of the vehicle is carried upon the aforementioned load carrying portion 27 of the bushing and that the radius of this portion is relatively large because of the inwardly inclining compression portions 28.

In this connection, it will be appreciated that it is impractical to provide a circular bushing having a radius equal to that permitted by the novel design of my resilient bushing herewithin described but that the actual loading carrying portion of my bushing meets the optimum requirements for efficient working conditions.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. In a spring suspension for vehicles, the combination of a chassis frame, a leaf spring provided at one end thereof with an eye, an axle secured to said leaf spring, and a shackle unit comprising a bar secured to said frame and projecting laterally therefrom, said bar having a polygonal configuration and including a convex lower wall and a pair of upwardly convergent side walls, a resilient bushing mounted on said bar and having a polygonal bore therein complemental to the cross-section of the bar, flanges provided at the ends of said bushing, caps mounted on said bar and embracing said flanges, said bushing having a substantially uniform wall thickness and having a polygonal outer configuration including a convex lower wall and a pair of upwardly convergent side walls, a casing conforming in cross-section to and positioned on said bushing, a pair of spaced shackle plates secured to said casing adjacent said caps and provided with a pair of aligned apertures, and a shackle pin extending through said leaf spring eye and through the apertures of said plates.

2. The structure as set forth in claim 1 together with means for urging said caps toward each other and in clamping engagement with the flanges of said bushing, whereby to subject the latter to longitudinal compression.

References Cited in the file of this patent

UNITED STATES PATENTS

| Number | Name | Date |
| --- | --- | --- |
| 1,897,806 | Jansson | Feb. 14, 1933 |
| 1,917,797 | Harris | July 11, 1933 |
| 2,259,827 | McReynolds | Oct. 21, 1941 |
| 2,366,860 | Kraft | Jan. 9, 1945 |

FOREIGN PATENTS

| Number | Country | Date |
| --- | --- | --- |
| 761,299 | France | Jan. 3, 1934 |